United States Patent
Okamoto et al.

(10) Patent No.: US 6,267,385 B1
(45) Date of Patent: Jul. 31, 2001

(54) GROMMET

(75) Inventors: Katsuo Okamoto; Masanori Okazawa; Yutaka Shibata, all of Chino; Katsuhiko Aoki; Hisayasu Tsujino, both of Omiya, all of (JP)

(73) Assignee: Kabushiki Kaisha Miyasaka Gomu, Nagano (JP)

( * ) Notice: Subject to any disclaimer, the term of this patent is extended or adjusted under 35 U.S.C. 154(b) by 0 days.

(21) Appl. No.: 09/254,207

(22) PCT Filed: Sep. 3, 1997

(86) PCT No.: PCT/JP97/03094

§ 371 Date: Mar. 3, 1999

§ 102(e) Date: Mar. 3, 1999

(87) PCT Pub. No.: WO98/10435

PCT Pub. Date: Mar. 12, 1998

(30) Foreign Application Priority Data

Sep. 5, 1996 (JP) .................................................. 8-235414

(51) Int. Cl.$^7$ ...................................................... F16L 5/02
(52) U.S. Cl. ......................... 277/627; 277/635; 277/650; 16/2.1; 174/77 R
(58) Field of Search .................................. 277/936, 635, 277/650, 627, 944; 384/907, 297, 287; 16/2.1; 174/65 G, 153 G, 77 R, 93

(56) References Cited

U.S. PATENT DOCUMENTS

| Re. 36,293 | * | 9/1999 | Mizui et al. . |
| 4,512,930 | * | 4/1985 | Romano . |
| 5,326,486 | * | 7/1994 | Mizui et al. . |
| 5,384,056 | * | 1/1995 | Tanaka et al. . |

FOREIGN PATENT DOCUMENTS

| 4-41526 | 9/1992 | (JP) . |
| 6-256599 | 9/1994 | (JP) . |
| 7-115286 | 5/1995 | (JP) . |
| 7-138586 | 5/1995 | (JP) . |

* cited by examiner

*Primary Examiner*—Chuck Y. Mah
*Assistant Examiner*—Enoch E Peavey

(57) ABSTRACT

A grommet which is formed from a self-lubricating rubber, and can be fixed by means of a wire such as electric wires and an adhesive tape. The rubber grommet (10) is fixed to the electric wire (14) with the adhesive tapes (12, 12) and inserted into a through hole (22) penetrating through a partition (20) to provide sealing between the electric wire (14) and an inner wall of the through hole (22). Rubber forming the grommet (10) is a self-lubricating rubber containing an oily polyalkyl carbonate, which is represented by the following chemical formula:

$$Ri-O-CO-O-[CH_2CH_2C(CH_3)HCH_2CH_2-O-CO-O]n-Ri$$

wherein n is an integer of 1 to 8, and Ri represents (i—$C_7H_{15}$).

9 Claims, 1 Drawing Sheet

GROMMET

This application is the national phase under 35 U.S.C. §371 of prior PCT International Application No. PCT/JP97/03094 which has an International filing date of Sep. 3, 1997 which designated the United States of America.

1. Technical Field

The present invention relates to a grommet, and more particularly to a rubber grommet fixed to a wire such as an electric wire with an adhesive tape and providing hermetical sealing between the wire passed through a through hole penetrating through a partition and an inner wall of the above-mentioned through hole.

2. Background Art

In recent years, electronic control has been employed for engine control in automotive vehicles. It has become therefore necessary that a larger number of wires such as electric wires as compared to the number of conventional ones are passed through through holes perforated through a partition dividing an engine room from a cabin to connect various instruments in the engine room to an operation panel in the cabin.

However, in stop, noise or water from entering the cabin, the cabin must be separated from the engine room and a trunk room. Also for the through holes perforated through the partition between the engine room and the cabin, it is necessary to provide hermetical sealing between the wires such as the electric wires passed through the through holes and inner walls thereof. As shown in FIG. 1, therefore, a grommet 10 is used which has a large diameter portion formed to be layer in diameter than the inside diameter of the through hole 22 perforated through the partition 20 between the engine room and the cabin. As shown in FIG. 2, this grommet 10 is formed of rubber in a hollow form, the electric wire 14 is inserted therethrough until the grommet reaches halfway of the wire, and the grommet is fixed to the electric wire 14 at both ends thereof with adhesive tapes 12 and 12.

Such an electric wire 14 to which the grommet 10 is fixed halfway is passed through the through hole 22 in the direction indicated by the arrow A (FIG. 1), thereby inserting the large diameter portion of the grommet 10 into the through hole 22 while being deformed. Thus, a periphery portion of the through hole 22 is received in a groove 18 adjacent to a flange 16. Consequently, the grommet 10 can provide sealing between the wire 14 passed through the through hole 22 and an inner wall of the through hole 22.

On the other hand, for facilitating the inserting operation of the grommet 10 when the grommet 10 is inserted into the through hole 22, a surface of the grommet 10 is coated with soapy water or oil in some cases. This is because the frictional resistance between the grommet 10 and the inner wall of the through hole 22 can be reduced by such application of soapy water or oil.

However, the coating operation of soapy water or oil complicates the inserting operation of the wire 14, so that a grommet 10 which can omit the coating operation of oil or the like has been desired.

DISCLOSURE OF INVENTION

Accordingly, the present inventors have tried to form a grommet, using self-lubricating rubber from which a lubricative component such as oil naturally bleeds out.

According to the grommet thus formed of the self-lubricating rubber, the operation for applying soapy water or oil can be omitted.

However, as the conventional self-lubricating rubber, one containing silicone oil or paraffin oil as the lubricative component which bleeds out has been used. However, it has become clear that the grommets from which these lubricative components bleed out can not be fixed to wires with adhesive tapes, because these lubricative components also act as release agents.

It is therefore an object of the present invention to provide a grommet formed of self-lubricating rubber and fixable to a wire such as an electric wire with an adhesive tape. As a result of studies for attaining the above-mentioned object, the present inventors have discovered that a grommet formed of self-lubricating rubber containing an oily polyalkyl carbonate as a lubricative component can be fixed to an electric wire with an adhesive tape, even if the lubricative component has bled out on a surface of the grommet, thus completing the present invention.

That is to say, the present invention provides a rubber grommet fixed to a wire such as an electric wire with an adhesive tape and providing hermetical sealing between the wire passed through a through hole penetrating through a partition and an inner wall of the above-mentioned through hole, in which the rubber forming the grommet is self-lubricating rubber containing a lubricative component which bleeds out on a surface of the grommet to allow a reduction in frictional resistance with the inner wall of the through hole, and an adhesive tape can be adhered to a surface of the above-mentioned grommet.

In the present invention, an oily polyalkyl carbonate represented by the following chemical formula is preferably used as the lubricative component.

Chemical Formula

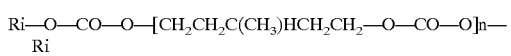

wherein n is an integer of 1 to 8, and Ri represents $(i-C_7H_{15})$.

Further, the addition of a copolymerized rubber of the ethylene-propylene family as a main component forming the rubber, particularly, the addition of ethylene-propylene copolymerized rubber (EPM) or ethylene-propylene-non-conjugated diene ternary copolymerized rubber (EPDM), alone or as a mixture, to the rubber in an amount of 60% by weight or more can give excellent heat resistance and resistance to ozone to the grommet.

Furthermore, the grommet having excellent heat resistance and resistance to ozone can be sufficiently fixed to the wire such as the electric wire with the adhesive tape such as a vinyl tape by adding 3 parts by weight or more of the oily polyalkyl carbonate represented by the following chemical formula to 100 parts by weight of the copolymerized rubber of the ethylene-propylene family, the main component forming the rubber.

Chemical Formula

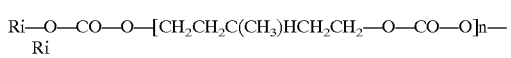

wherein n is an integer of 1 to 8, and Ri represents $(i-C_7H_{15})$.

According to the present invention, the rubber forming the grommet is formed of the self-lubricating rubber, and the lubricative component bleeds out on the surface of the grommet. Accordingly, the frictional resistance of the grommet with the inner wall of the through hole perforated through the partition can be reduced, and the operation for coating the surface of the grommet with soapy water or oil can be omitted.

Moreover, the lubricative component which bleeds out on the surface of the grommet does not substantially inhibit adhesive ability of an adhesive forming the adhesive tape, so that the adhesive tape can be adhered to the surface of the grommet on which the lubricative component bleeds out.

As a consequence, the grommet formed of the self-lubricating rubber containing the lubricative component which bleeds out on the surface thereof can be fixed to the wire with the adhesive tape, so that the use of the grommet of the present invention allows the sealing operation for providing hermetical sealing between the wire passed through the through hole and the inner wall thereof to be easily conducted.

BEST MODE FOR CARRYING OUT THE INVENTION

Figure 1:
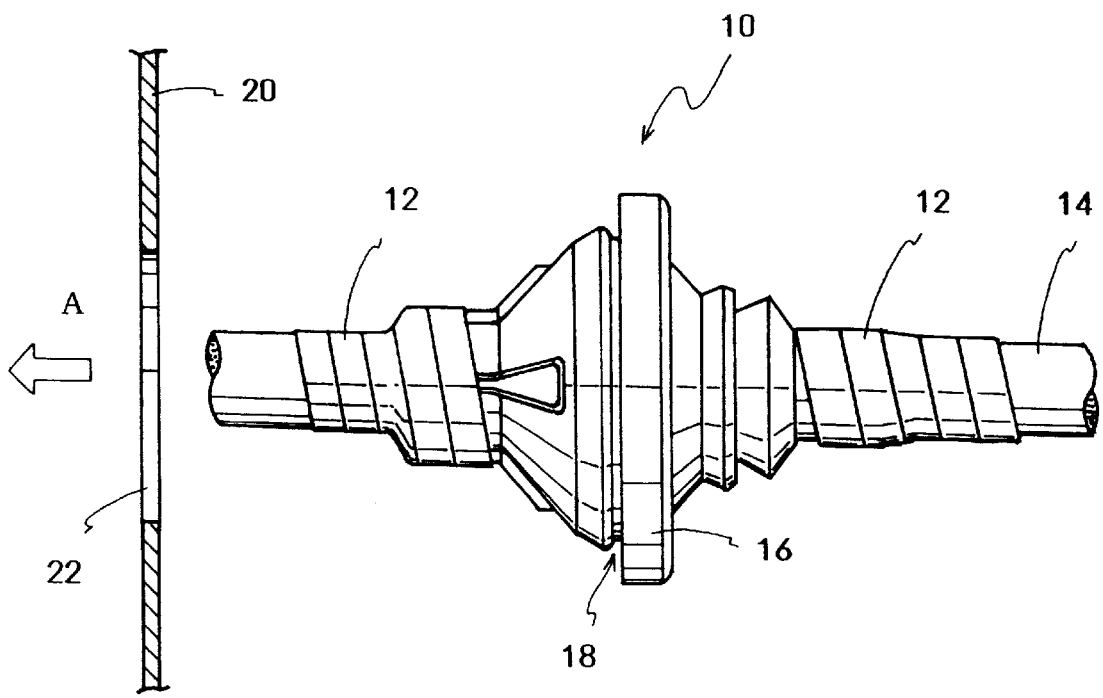
FIG. 1 is an illustrative view for illustrating a state in which an electric wire is inserted through a grommet.

The grommets according to the present invention are required to be formed of the self-lubricating rubber containing the lubricative components which can bleed out on the surfaces of the grommets to reduce the frictional resistance with the inner walls of the through holes.

As raw rubber used for such rubber, raw rubber containing copolymerized rubber of the ethylene-propylene family as a main component is preferred because of its excellent heat resistance and resistance to ozone. In particular, raw rubber containing ethylene-propylene copolymerized rubber (EPM) or ethylene-propylene-non-conjugated diene ternary copolymerized rubber (EPDM), alone or as a mixture, in the rubber in an amount of 60% by weight or more is preferred, because it can exhibit more excellent heat resistance and resistance to ozone.

As rubber blended with such copolymerized rubber of the ethylene-propylene family, natural rubber (NR) or styrenic rubber (SBR) is preferred.

Here, when rubber containing acrylonitrile-butadiene rubber as a main component is used as raw rubber, the resulting grommet tends to decrease in heat resistance and resistance to ozone, compared with the grommet obtained from the raw rubber containing the copolymerized rubber of the ethylehe-propylene family as the main component.

The lubricative components added to such raw rubber bleed out on the surfaces because of their low compatibility with the raw rubber, and can reduce the frictional resistance of the inner walls of the through holes with the surfaces of the grommets. Moreover, it is important that the adhesive tapes can be adhered to the surfaces of the grommets on which the lubricative components have bled out, because of their compatibility with the adhesives of the adhesive tapes.

As such a lubricative component, the oily polyalkyl carbonate represented by the following chemical formula can be suitably used.

Chemical Formula

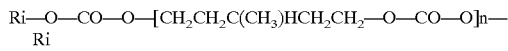

wherein n is an integer of 1 to 8, and Ri represents $(i-C_7H_{15})$.

This polyalkyl carbonate has a viscosity (40° C.) of about 10 to 500 centistokes (cSt) to be oily, and in terms of the processability of the self-lubricating rubber and the properties of the resulting grommets, it is preferably added in an amount of 3 parts by weight or more, preferably 10 to 50 parts by weight, based on 100 parts by weight of the copolymerized rubber of the ethylene-propylene family which is the main component for forming the rubber.

For obtaining such a polyalkyl carbonate, a diol represented by the following chemical formula A, a carbonate compound represented by the following chemical formula B and a monohydric alcohol represented by the following chemical formula C, which has a lower boiling point than the diol are allowed to react in the presence of a base catalyst with heating.

Chemical Formula A

Chemical Formula B

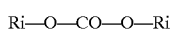

wherein Ri represents $(i-C_7H_{15})$.

Chemical Formula C

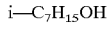

In this reaction, it is preferred that the amounts of the carbonate compound represented by chemical formula B and the diol represented by chemical formula A are adjusted so that the molar ratio $(m_1/2m_2)$ of the molar number $(m_1)$ of the carbonate compound to the molar number $(m_2)$ of the diol ranges from 0.5 to 200.

Further, during the reaction, alcohols are generated as by-products. It is therefore preferred that the reaction is allowed to proceed while removing the alcohols by distillation to obtain a reaction rate of 95% or more.

Then, the base catalyst is removed after the reaction has been terminated, and thereafter, the unreacted carbonate compound used as a raw material is removed by distillation, thereby obtaining the polyalkyl carbonate.

Before such a reaction is initiated, the air in a reaction vessel is preferably replaced by nitrogen, but the nitrogen replacement may not be carried out.

When the oily polyalkyl carbonate thus obtained is added to the raw rubber, additives added to the rubber forming the conventional grommets, such as paraffin process oil, naphthene process oil, an ester plasticizer, carbon black, dry silica and talc, may be added, and an antioxidant and a curing agent are further also added in small amounts.

Here, paraffin process oil, naphthene process oil and an ester plasticizer are preferably added in an amount of 150 parts by weight or less based on 100 parts by weight of rubber, and fillers such as carbon black, dry silica and talc are preferably added in an amount of 100 parts by weight or less based on 100 parts by weight of rubber.

When such additives are mixed with the raw rubber, they can be kneaded using an internal mixer such as a Banbury mixer, or an open roll. Specifically, after mastication of the raw rubber, the polyalkyl carbonate, the plasticizers and fillers are added thereto, followed by kneading. Then, the mixture in which kneading has been terminated is cooled, followed by addition and kneading of the curing agent and a curing accelerator on a roll.

The rubber thus mixed with various additives is formed to grommets having a specified shape by use of a forming mold, and heated in the forming mold at about 130° C. to about 200° C., thereby obtaining rubber grommets.

The resulting grommet can be fixed to the electric wire 14 inserted therethrough with the adhesive tapes 12 and 12, as shown in FIG. 1. This is because polyalkyl carbonate which has been added to the rubber for forming the grommet 10 and bled out on the surface of the grommet 10 does not substantially inhibit the adhesive ability of the adhesive of the adhesive tapes 12 and 12.

Thus, the grommet 10 fixed to the electric wire 14 with the adhesive tapes 12 and 12 is inserted into the through hole 22 together with the wire 14. In that case, the surface of the grommet 10 on which the polyalkyl carbonate has bled out is reduced in the frictional resistance with the inner wall of the through hole 22, so that the periphery portion of the through hole 22 can be easily received in the groove 18 of the grommet 10, combined with the deformation of the grommet 10. Consequently, the grommet 10 can easily provide sealing between the wire 14 passed through the through hole 22 and the inner wall of the through hole 22.

In FIG. 1, the electric wire 14 is inserted through the grommet. However, this invention can also be applied, of course, to the case in which a wire is used in place of the electric wire 14.

EXAMPLES

The present invention will be further illustrated in greater detail with reference to the following examples.

Examples 1 to 3 and Comparative Examples 1 and 2

Figure 2:
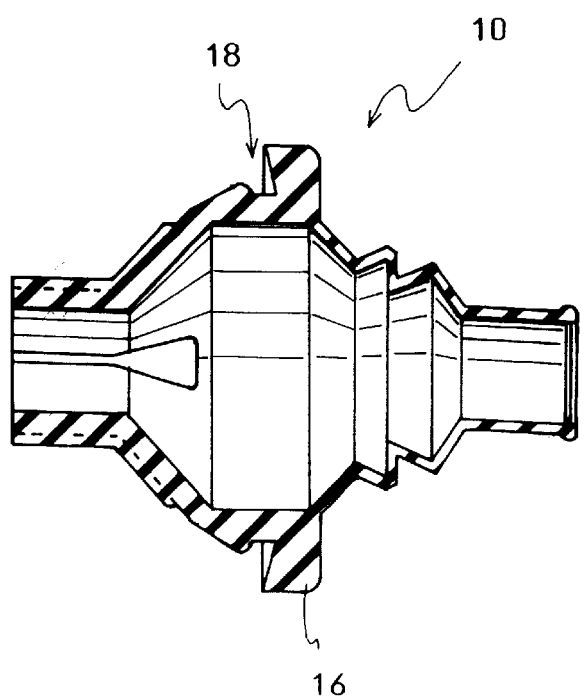
FIG. 2 is a cross sectional view of the grommet shown in FIG. 1.

Raw materials of each level shown in Table 1 were added and kneaded with an 8-inch open roll, and then, cured and formed with a 100-ton press to obtain the grommet shown in FIG. 2 and a cured rubber sheet for test.

Using the resulting cured rubber sheet for test, cured rubber properties, bleeding out properties and vinyl tape peel strength were measured, and results thereof are shown together in Table 1, wherein the cured rubber properties were measured based on the physical test methods of cured rubber of JIS K-6301.

Of the bleeding out properties, the oil bleeding property was based on visual observation, and the oil bleeding amount was determined by allowing a small piece of the cured rubber sheet weighed on a precision balance to stand at room temperature for 2 days, and thereafter, sufficiently wiping a surface of the small piece, followed by weighing on a precision balance.

TABLE 1

| (Formulation) | Part by Weight | Example 1 | Example 2 | Example 3 | Comparative Example 1 | Comparative Example 2 |
|---|---|---|---|---|---|---|
| EPT Rubber *1 | | 120 | 120 | 120 | 120 | 120 |
| Zinc White No. 3 | | 5 | 5 | 5 | 5 | 5 |
| Stearic Acid | | 1 | 1 | 1 | 1 | 1 |
| SRF Carbon Black | | 25 | 25 | 25 | 25 | 25 |
| NIPSIL VN3 *2 | | 20 | 20 | 20 | 20 | 20 |
| WHITON SB *3 | | 20 | 20 | 20 | 20 | 20 |
| Paraffin Process Oil | | 25 | 25 | 25 | 25 | 25 |
| PEG 4000 *4 | | 1 | 1 | 1 | 1 | 1 |
| Polyalkyl Carbonate Oil *5 | | 5 | 15 | 30 | — | — |
| Methylphenylsilicone Oil *6 | | — | — | — | — | 5 |
| NOCCELER M (Curing Agent) *7 | | 1.0 | 1.0 | 1.0 | 1.0 | 1.0 |
| NOCCELER CZ (Curing Agent) *8 | | 1.0 | 1.0 | 1.0 | 1.0 | 1.0 |
| NOCCELER TT (Curing Agent) *9 | | 0.8 | 0.8 | 0.8 | 0.8 | 0.8 |
| NOCCELER TRA (Curing Agent) *10 | | 0.8 | 0.8 | 0.8 | 0.8 | 0.8 |
| Curing Agent (Sulfur) | | 1.2 | 1.2 | 1.2 | 1.2 | 1.2 |
| Cured Rubber Properties | | | | | | |
| Hardness (JIS-A) | | 55 | 50 | 46 | 56 | 55 |
| Tensile strength (Kgf/cm2) | | 195 | 185 | 175 | 195 | 190 |
| Elongation (%) | | 680 | 710 | 730 | 670 | 690 |
| Oil Bleeding Properties *11 | | ○ | ○ | ○ | × | ○ |
| Oil Bleeding Amount (mg) *12 | | 2.5 | 9.0 | 15.5 | 0 | 8.5 |
| Vinyl Tape Peel Strength *13 | | 0.11 | 0.11 | 0.10 | 0.13 | 0 |

Footnotes of Table 1
*1; EPT 3062E, manufactured by Mitsui petrochemical Industries, Ltd., 20-part oil extended product
*2; Reinforcing Agent, manufactured by NIPPON SILICA INDUSTRIAL Co., LTD., trade name
*3; Filler, manufactured by SHIRAISHI CALCIUM KAISHA LTD., trade name
*4; Polyethylene Glycol, molecular weight: 4,000
*5; $C_7H_{15}$—O—CO—O—$CH_2CH_2C(CH_3)HCH_2CH_2$—O—CO—O—$C_7H_{15}$ (3-Methyl-1,5-pentanediol diheptylcarbonate), molecular weight: 402, viscosity (40° C.): 29.2 cSt
*6; SH550, manufactured by Toray Silicone Co., Ltd., viscosity (25° C.): 125 cSt
*7; Curing Accelerator, manufactured by OUCHI SHINKO CHEMICAL INDUSTRIAL Co. LTD., trade name
*8; Curing Accelerator, manufactured by OUCHI SHINKO CHEMICAL INDUSTRIAL Co. LTD., trade name
*9; Curing Accelerator, manufactured by OUCHI SHINKO CHEMICAL INDUSTRIAL Co. LTD., trade name
*10; Curing Accelerator, manufactured by OUCHI SHINKO CHEMICAL INDUSTRIAL Co. LTD., trade name
*11; Visual observation, Oil bleeding was observed. No Oil bleeding was observed.
*12; The amount of oil bled out of 10 $cm^2$ of a cured rubber sheet having a thickness of 2 mm
*13; The force required when a commercial adhesive vinyl tape having a width of 1 cm adhered to a sample is peeled off in a direction of 180° C. to the sample, unit: kgf/cm As is apparent from Table 1, for the cured rubber sheets for test formed of the rubber containing the polyalkyl carbonate, the adhesive vinyl tapes could be adhered to the surfaces on which the polyalkyl carbonate was bled out.

Example 4

An electric wire was inserted through each of the grommets obtained in Examples 1 to 3 and Comparative Examples 1 and 2, and fixed thereto with adhesive vinyl tapes as shown in FIG. 1.

Then, the grommet was pressed, together with the electric wire, into a through hole to try to provide hermetical sealing between the electric wire passed through the through hole and the inner wall of the through hole.

As a result, each of the grommets obtained in Examples 1 to 3 could be easily inserted, together with the electric wire, into the through hole, and a periphery portion of the through hole could be easily received in a groove of each grommet.

In contrast, the grommet obtained in Comparative Example 1 could retain the fixed state of the electric wire and the grommet when the grommet was inserted into the through hole, but could not be easily inserted into the through hole because of its high frictional resistance with the inner wall of the through hole.

Further, the grommet obtained in Comparative Example 2 was low in its frictional resistance with the inner wall of the through hole when the grommet was inserted into the through hole, so that it could be easily inserted into the through hole. However, the adhesive vinyl tapes were separated, which made it impossible to retain the fixed state of the electric wire and the grommet in some cases.

Industrial Applicability

According to the grommets of the present invention, the through holes of the partitions can be easily sealed while passing the wires such as the electric wires therethrough, which can make the sealing operation of the through holes easy. They can be therefore suitably used in the automobile industry in which automation of assembling has progressed.

What the claimed is:

1. A rubber grommet fixed to a wire with an adhesive tape and providing hermetical sealing between the wire passed through a through hole penetrating through a partition and an inner wall of said through hole, in which the rubber forming the grommet is self lubricating rubber containing an oily polyalkyl carbonate lubricative component which bleeds out on a surface of the grommet to allow a reduction in frictional resistance with the inner wall of the through hole, said grommet receiving an adhesive tape that can be adhered to an oil bleeding surface of said grommet.

2. The grommet according to claim 1, wherein the oily polyalkyl carbonate is represented by the following chemical formula:

Chemical Formula

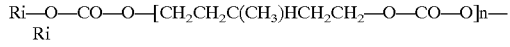

wherein n is an integer of 1 to 8, and Ri represents (i—$C_7H_{15}$).

3. The grommet according to claim 2, wherein a main component forming the rubber is copolymerized rubber of the ethylene-propylene family.

4. The grommet according to claim 2, wherein ethylene-propylene copolymerized rubber (EPM) or ethylene-propylene-non-conjugated diene ternary copolymerized rubber (EPDM) is contained alone or as a mixture in an amount of 60% by weight or more in the rubber.

5. The grommet according to claim 1, wherein a main component forming the rubber is copolymerized rubber of the ethylene-propylene family.

6. The grommet according to claim 5, wherein ethylene-propylene copolymerized rubber (EPM) or ethylene-propylene-non-conjugated diene ternary copolymerized rubber (EPDM) is contained alone or as a mixture in an amount of 60% by weight or more in the rubber.

7. The grommet according to claim 1, wherein the oily polyalkyl carbonate represented by the following chemical formula is contained in an amount of 3 parts by weight or more, based on 100 parts by weight of copolymerized rubber of the ethylene-propylene family which is a main component for forming the rubber Chemical Formula

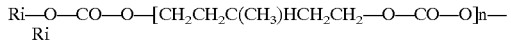

wherein n is an integer of 1 to 8, and Ri represents (i—$C_7H_{15}$).

8. The grommet according to claim 7, wherein ethylene-propylene copolymerized rubber (EPM) or ethylene-propylene-non-conjugated diene ternary copolymerized rubber (EPDM) is contained alone or as a mixture in an amount of 60% by weight or more in the rubber.

9. The grommet according to claim 1, wherein ethylene-propylene copolymerized rubber (EPM) or ethylene-propylene-non-conjugated diene ternary copolymerized rubber (EPDM) is contained alone or as a mixture in an amount of 60% by weight or more in the rubber.

* * * * *

UNITED STATES PATENT AND TRADEMARK OFFICE
CERTIFICATE OF CORRECTION

PATENT NO.   : 6,267,385 B1
DATED        : July 31, 2001
INVENTOR(S)  : Katsuo Okamoto et al.

It is certified that error appears in the above-identified patent and that said Letters Patent is hereby corrected as shown below:

Title page,
Item [73], Inventors, change to -- Kabushiki Kaisha Miyasaka Gomu, Nagano, Japan; and Calsonic Kansei Corporation, Tokyo, Japan --.

Signed and Sealed this

Sixth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,267,385 B1
DATED : July 31, 2001
INVENTOR(S) : Katsuo Okamoto et al.

It is certified that error appears in the above-identified patent and that said Letters Patent is hereby corrected as shown below:

<u>Title page,</u>
Item [73], Assignee, change to -- Kabushiki Kaisha Miyasaka Gomu, Nagano, Japan; and Calsonic Kansei Corporation, Tokyo, Japan --.

Signed and Sealed this

Fifteenth Day of November, 2005

JON W. DUDAS
*Director of the United States Patent and Trademark Office*